United States Patent
Siby-Kurian et al.

(10) Patent No.: US 12,514,617 B2
(45) Date of Patent: Jan. 6, 2026

(54) MODULAR SET SCREW DESIGN FOR HOUSING MICROELECTRONICS

(71) Applicant: Warsaw Orthopedic, Inc., Warsaw, IN (US)

(72) Inventors: Arjun Siby-Kurian, Memphis, TN (US); Chris E. Johnson, Germantown, TN (US); Richard L. Brown, Mesa, AZ (US); Richard W. Franks, Collierville, TN (US); Newton Metcalf, Memphis, TN (US)

(73) Assignee: WARSAW ORTHOPEDIC, INC., Warsaw, IN (US)

( * ) Notice: Subject to any disclaimer, the term of this patent is extended or adjusted under 35 U.S.C. 154(b) by 962 days.

(21) Appl. No.: 17/148,070

(22) Filed: Jan. 13, 2021

(65) Prior Publication Data

US 2021/0153909 A1    May 27, 2021

Related U.S. Application Data

(63) Continuation-in-part of application No. 16/509,285, filed on Jul. 11, 2019, now abandoned, and a
(Continued)

(51) Int. Cl.
*A61B 17/70* (2006.01)
*A61B 5/00* (2006.01)
*A61B 17/00* (2006.01)

(52) U.S. Cl.
CPC ........ *A61B 17/7032* (2013.01); *A61B 5/4566* (2013.01); *A61B 17/7002* (2013.01);
(Continued)

(58) Field of Classification Search
CPC ............ A61B 17/7032; A61B 17/7034; A61B 5/4566; A61B 5/4851; A61B 5/6878; A61B 5/0031; A61B 5/076
See application file for complete search history.

(56) References Cited

U.S. PATENT DOCUMENTS

| 3,444,775 A | 5/1969 | Hills |
| 6,004,349 A | 12/1999 | Jackson |

(Continued)

FOREIGN PATENT DOCUMENTS

| CN | 103140168 A | 6/2013 |
| CN | 110582229 A | 12/2019 |

(Continued)

OTHER PUBLICATIONS

International Search Report and Written Opinion in Application No. PCT/IB2023/053707 dated Jul. 24, 2023.

(Continued)

*Primary Examiner* — Jennifer Robertson
*Assistant Examiner* — Huong Nguyen
(74) *Attorney, Agent, or Firm* — FOX ROTHSCHILD LLP

(57) ABSTRACT

A load sensing assembly for a spinal implant is disclosed. The load sensing assembly may include: a set screw having a drive interface, a lower cavity for receiving a cover, the cover including a protrusion that may engage with an anchoring member. The load sensing assembly may further include an antenna, and at least one sensor having an integrated circuit in communication with the antenna. In some embodiments, the integrated circuit is positioned within a sealed cavity of the set screw. In some embodiments, a connecting wire extends through a through hole of the set screw and into the sealed cavity to connect the antenna with the at least one sensor. In some embodiments, the cap is welded to the set screw, the through hole is filled with an insulative material, and the sealed cavity of the set screw is hermetically sealed.

16 Claims, 9 Drawing Sheets

Related U.S. Application Data continuation-in-part of application No. 16/395,221, filed on Jul. 3, 2019, now Pat. No. 11,707,299, and a continuation-in-part of application No. 16/395,212, filed on Apr. 25, 2019, now Pat. No. 11,529,208, and a continuation-in-part of application No. 16/395,216, filed on Apr. 25, 2019, now Pat. No. 11,589,905, and a continuation-in-part of application No. 16/039,592, filed on Jul. 19, 2018, now Pat. No. 11,298,162.

(52) U.S. Cl.
CPC ............ *A61B 2017/00221* (2013.01); *A61B 2560/0214* (2013.01); *A61B 2562/0214* (2013.01); *A61B 2562/0247* (2013.01); *A61B 2562/0261* (2013.01)

(56) References Cited

U.S. PATENT DOCUMENTS

| | | |
|---|---|---|
| 6,280,445 B1 | 8/2001 | Morrison et al. |
| 6,485,491 B1 | 11/2002 | Farris et al. |
| 6,884,244 B1 | 4/2005 | Jackson |
| 7,357,037 B2 | 4/2008 | Hnat et al. |
| 7,993,269 B2 | 8/2011 | Donofrio et al. |
| 8,057,519 B2 | 11/2011 | Justis et al. |
| 8,372,147 B2 | 2/2013 | Roche |
| 8,868,200 B2 | 10/2014 | Abrahamson et al. |
| 8,882,803 B2 | 11/2014 | Iott et al. |
| 9,241,738 B2 | 1/2016 | Quevedo et al. |
| 9,498,294 B2 | 11/2016 | Rigsby et al. |
| 9,585,602 B1 | 3/2017 | Navarro et al. |
| 9,711,840 B2 | 7/2017 | Lin |
| 10,219,699 B2 | 3/2019 | Wilder et al. |
| 10,362,982 B2 | 7/2019 | Stevenson et al. |
| 2003/0073996 A1 | 4/2003 | Doubler et al. |
| 2005/0018749 A1 | 1/2005 | Sato et al. |
| 2005/0187549 A1 | 8/2005 | Jackson |
| 2005/0267477 A1 | 12/2005 | Jackson |
| 2006/0052782 A1* | 3/2006 | Morgan ............ A61B 5/14539 606/60 |
| 2007/0017295 A1 | 1/2007 | Ohta et al. |
| 2007/0073300 A1* | 3/2007 | Attawia ............ A61B 17/7032 606/328 |
| 2007/0100218 A1 | 5/2007 | Sweitzer et al. |
| 2008/0133009 A1 | 6/2008 | Caylor |
| 2009/0143696 A1 | 6/2009 | Najafi et al. |
| 2009/0171178 A1 | 7/2009 | He et al. |
| 2009/0198273 A1 | 8/2009 | Zhang et al. |
| 2009/0228074 A1 | 9/2009 | Edgell et al. |
| 2009/0234391 A1 | 9/2009 | Butler et al. |
| 2009/0298650 A1 | 12/2009 | Kutliroff |
| 2010/0152621 A1 | 6/2010 | Janna et al. |
| 2010/0201118 A1 | 8/2010 | Anton et al. |
| 2010/0217331 A1 | 8/2010 | Spagnoli et al. |
| 2010/0298886 A1 | 11/2010 | Kraus et al. |
| 2011/0106179 A1 | 5/2011 | Prevost et al. |
| 2011/0213221 A1 | 9/2011 | Roche |
| 2012/0059389 A1 | 3/2012 | Larson et al. |
| 2012/0143029 A1 | 6/2012 | Silverstein et al. |
| 2012/0221057 A1 | 8/2012 | Zhang et al. |
| 2013/0076157 A1 | 3/2013 | Stein |
| 2013/0079669 A1 | 3/2013 | Stein et al. |
| 2013/0079680 A1 | 3/2013 | Stein et al. |
| 2013/0096396 A1 | 4/2013 | Riedel |
| 2013/0253334 A1 | 9/2013 | Al-Ali et al. |
| 2014/0214097 A1 | 7/2014 | Jackson et al. |
| 2015/0080901 A1 | 3/2015 | Stein |
| 2015/0164401 A1 | 6/2015 | Toth et al. |
| 2015/0201974 A1 | 7/2015 | DeRidder et al. |
| 2015/0257687 A1 | 9/2015 | Pushpala et al. |
| 2016/0128573 A1 | 5/2016 | Wilder et al. |
| 2016/0235480 A1 | 8/2016 | Scholl et al. |
| 2016/0331415 A1 | 11/2016 | Serhan et al. |
| 2017/0007420 A1 | 1/2017 | Stevenson et al. |
| 2017/0079555 A1 | 3/2017 | Munro et al. |
| 2017/0138387 A1 | 5/2017 | Saigo et al. |
| 2017/0196499 A1 | 7/2017 | Hunter |
| 2017/0231559 A1 | 8/2017 | Cuevas et al. |
| 2018/0310964 A1 | 11/2018 | Stevenson et al. |
| 2019/0344070 A1 | 11/2019 | Molnar et al. |
| 2019/0346313 A1 | 11/2019 | Cox |
| 2020/0022733 A1 | 1/2020 | Benson et al. |
| 2020/0022735 A1 | 1/2020 | Fields et al. |
| 2020/0022739 A1 | 1/2020 | Benson et al. |
| 2020/0022740 A1 | 1/2020 | Benson et al. |
| 2020/0022772 A1 | 1/2020 | Benson et al. |
| 2020/0069247 A1 | 3/2020 | Hunter |
| 2020/0085366 A1 | 3/2020 | Benson et al. |
| 2020/0297513 A1 | 9/2020 | Zellmer et al. |
| 2020/0330230 A1* | 10/2020 | MacEwan ............ A61N 1/326 |
| 2020/0405239 A1* | 12/2020 | Trabish ............ A61B 5/6828 |
| 2021/0186567 A1 | 6/2021 | Bobbitt et al. |
| 2021/0361377 A1 | 11/2021 | Metcalf et al. |
| 2022/0160428 A1 | 5/2022 | Murray et al. |
| 2022/0273391 A1 | 9/2022 | Metcalf, Jr. et al. |
| 2022/0378370 A1 | 12/2022 | Pasha |

FOREIGN PATENT DOCUMENTS

| | | |
|---|---|---|
| JP | 2015532841 A | 11/2015 |
| KR | 10-1851690 B1 | 4/2018 |
| WO | 2013109762 A1 | 7/2013 |
| WO | 2015200720 A2 | 12/2015 |
| WO | 2017006068 A1 | 1/2017 |
| WO | 2017180653 A1 | 10/2017 |
| WO | 2020018862 A1 | 1/2020 |

OTHER PUBLICATIONS

European Search Report in Application No. 19838911.6 dated Apr. 4, 2022.
International Search Report, PCT/US2019/042516, Oct. 31, 2019.
International Search Report, PCT/US2019/042511, Oct. 31, 2019.
European Search Report in Application No. 21168012.9 dated Sep. 20, 2021.
International Search Report and Written Opinion in Application No. PCTUS2019050717 mailed Jan. 3, 2020.
Rodriguez-Martin, et al. "A wearable inertial measurement unit for long-term monitoring in the dependency care area." Sensors 13.10 (2013): 14079-14104. (Year: 2016).
Conway, Justin, Christy C. Tomkins, and Andrew J. Haig. "Walking assessment in people with lumbar spinal stenosis: capacity, performance, and self-report measures." The Spine Journal 11.9 (2011): 816-823. (Year: 2011).
Trost, et al. "Conducting accelerometer-based activity assessments in field-based research." Medicine & Science in Sports & Exercise 37.11 (2005): S531-S543. (Year: 2005).
Liu, Ye, et al. "From action to activity: sensor-based activity recognition." Neurocomputing 181 (2016): 108-115. (Year: 2016).
Ahmadi, Amin, et al. "Automatic activity classification and movement assessment during a sports training session using wearable inertial sensors." 2014 11th International Conference on Wearable and Implantable Body Sensor Networks. IEEE, 2014. (Year: 2014).
European Search Report in Application No. 20837889 dated Apr. 25, 2023.
Karipott Salil Sidharthan et al: "An Embedded Wireless Temperature Sensor for Orthopedic Implants", IEEE Sensors Journal, IEEE, USA, vol. 18, No. 3, Feb. 1, 2018 (Feb. 1, 2018), pp. 1265-1272, XP011675608, ISSN: 1530-437X, DOI: 10.1109/JSEN.2017.2780226.
European Search Report in Application No. 19838132.9 dated Apr. 4, 2022.
European Search Report in Application No. 19837036.3 dated Apr. 4, 2022.
Chinese Office Action in Application No. 201980047442.2 dated Jun. 27, 2023.
International Search Report and Written Opinion in Application No. PCT/IB2023/053713 dated Jul. 28, 2023.

(56) References Cited

OTHER PUBLICATIONS

International Search Report and Written Opinion in Application No. PCT/IB2023/053705 dated Jul. 7, 2023.
Chinese Office Action in Application No. 202110429353.3 dated Feb. 17, 2025.
International Search Report in Application No. PCT/IB2024/054039 date of completion is Jun. 27, 2024 (13 pages).

* cited by examiner

MODULAR SET SCREW DESIGN FOR HOUSING MICROELECTRONICS

CROSS-REFERENCE TO RELATED U.S. PATENT APPLICATION

This Application is a continuation-in-part of: U.S. Nonprovisional patent application Ser. No. 16/039,592 entitled "Load sensing assembly for a spinal implant," filed Jul. 19, 2018; U.S. Nonprovisional patent application Ser. No. 16/395,212 entitled "Break Off Set Screw with Offset Hex," filed Apr. 25, 2019; U.S. Nonprovisional patent application Ser. No. 16/395,216 entitled "Set Screw Sensor Placement," filed Apr. 25, 2019; U.S. Nonprovisional patent application Ser. No. 16/395,221 entitled "Antenna Placement for a Digital Set Screw," filed Jul. 3, 2019; and U.S. Nonprovisional patent application Ser. No. 16/509,285 entitled "Temp Sensing Array for Set Screw Infection Monitoring," filed Jul. 11, 2019. The disclosures of each priority patent application are fully incorporated into this document by reference.

TECHNICAL FIELD

The present disclosure generally relates to mechanical and electrical sensor assemblies for implant devices, and more particularly to implant systems including a set screw that may be used to secure a connection between a longitudinal rod and a pedicle screw, hook or other connector which may be used to treat various spinal disorders.

BACKGROUND

Treatment of spinal disorders, such as degenerative disc disease, disc herniations, scoliosis or other curvature abnormalities, and fractures, often requires surgical treatments. For example, spinal fusion may be used to limit motion between vertebral members. As another example, implants may be used to preserve motion between vertebral members.

Surgical treatment typically involves the use of longitudinal members, such as spinal rods. Longitudinal members may be attached to the exterior of two or more vertebral members to assist with the treatment of a spinal disorder. Longitudinal members may provide a stable, rigid column that helps bones to fuse, and may redirect stresses over a wider area away from a damaged or defective region. Also, rigid longitudinal members may help in spinal alignment.

Screw assemblies may be used to connect a longitudinal member to a vertebral member. A screw assembly may include a pedicle screw, hook, or other connector and/or a set screw, among other components. A pedicle screw can be placed in, above and/or below vertebral members that were fused, and a longitudinal member can be used to connect the pedicle screws which inhibits or controls movement. A set screw can be used to secure the connection of a longitudinal member and a pedicle screw, hook or other connector. However, the connection force and continued integrity of the connection between a longitudinal member and a pedicle screw or other connector can be challenging to monitor during and after implantation. In addition, it is difficult to monitor that an appropriate force is maintained between a set screw and a longitudinal member. Conventional load assemblies and/or screw assemblies are not capable of wirelessly transmitting the connection force between a longitudinal rod and a pedicle screw installed within a patient. Furthermore, they cannot continuously monitor and a secure connection on relatively long time frames.

SUMMARY

In an embodiment, a load sensing assembly for a spinal implant may include a set screw having a drive interface including a bottom surface, a cover portion seated in a corresponding cover cavity, the cover including a protrusion. The set screw may further include an antenna, and at least one sensor including an integrated circuit in communication with the antenna. The sensor may be configured to detect an external compression force applied to the protrusion. In some embodiments, the sensor and integrated circuit may be positioned within a sealed cavity of the set screw. In some embodiments, the sealed cavity may be defined, at least partly, by the cover and the bottom surface of the drive interface. Additionally, the antenna may be configured to transmit information received from the at least one sensor to an external device.

In another embodiment, the set screw may further include a through hole passing from a top surface of the set screw and through a sidewall of the set screw into the sealed cavity, and the antenna may be located, at least in part, proximate to a top portion of the set screw.

In another embodiment, the antenna may further include a connecting wire that is electrically connected to the integrated circuit, and the connecting wire may extend through the through hole of the set screw and into the sealed cavity.

In another embodiment, the antenna further includes an overmold, the cap may welded to the set screw, the through hole may be filled with an insulative material, and the sealed cavity of the set screw may be hermitically sealed.

In another embodiment, a plurality of electronics components including the at least one sensor and the integrated circuit.

In another embodiment, the set screw further includes another sensor that comprises one or more of the following: a strain gauge, impedance sensor, pressure sensor, and capacitive sensor.

In another embodiment, the at least one sensor may be operably connected to the cap and configured to sense an external force applied to the protrusion.

In another embodiment, the electronics components may be powered by electromagnetic energy.

In another embodiment, the electronics components may not be powered by a battery.

In another embodiment, the at least one sensor may be configured to measure a force between the set screw and a longitudinal member when the set screw may be engaged with the anchoring member.

In another embodiment, a load sensing system may be disclosed. The system may include a plurality of load sensing assemblies and each may include a set screw having a drive interface including a bottom surface, a cover portion seated in a corresponding cover cavity, the cover including a protrusion. Each set screw may further include an antenna, and at least one sensor including an integrated circuit in communication with the antenna. Each sensor may be configured to detect an external compression force applied to the corresponding protrusion. In some embodiments, each sensor and each integrated circuit may be positioned within a corresponding sealed cavity of the corresponding set screw. In some embodiments, each sealed cavity may be defined, at least partly, by the corresponding cover and the corresponding bottom surface of the corresponding drive interface. Additionally, each antenna may be configured to transmit information received from the corresponding at least one sensor to an external device.

In another embodiment, each set screw may include a through hole passing from a top surface of the corresponding set screw and through a sidewall of the corresponding set screw into the corresponding sealed cavity, and each antenna may be located, at least in part, proximate to a top portion of the corresponding set screw.

In another embodiment, each antenna may include a connecting wire that may be electrically connected to the corresponding integrated circuit, and each connecting wire may extend through the corresponding through hole of the corresponding set screw and into the corresponding sealed cavity.

In another embodiment, each antenna may further comprise an overmold, each cap may be welded to the corresponding set screw, each through hole may be filled with an insulative material, and each sealed cavity of the corresponding set screw may be hermetically sealed.

In another embodiment, a plurality of electronics components including the at least one sensor and the integrated circuit may be provided.

In another embodiment, each set screw further includes another sensor that comprises one or more of the following: a strain gauge, impedance sensor, pressure sensor, and capacitive sensor.

In another embodiment, the at least one sensor may be operably connected to the cap and configured to sense an external force applied to the protrusion.

In another embodiment, the electronics components of each set screw may be powered by electromagnetic energy.

In another embodiment, the electronics components of each set screw may not be powered by a battery.

In another embodiment, the at least one sensor may be configured to measure a force between the set screw and a longitudinal member when the set screw may be engaged with the anchoring member.

DETAILED DESCRIPTION

Figure 1:
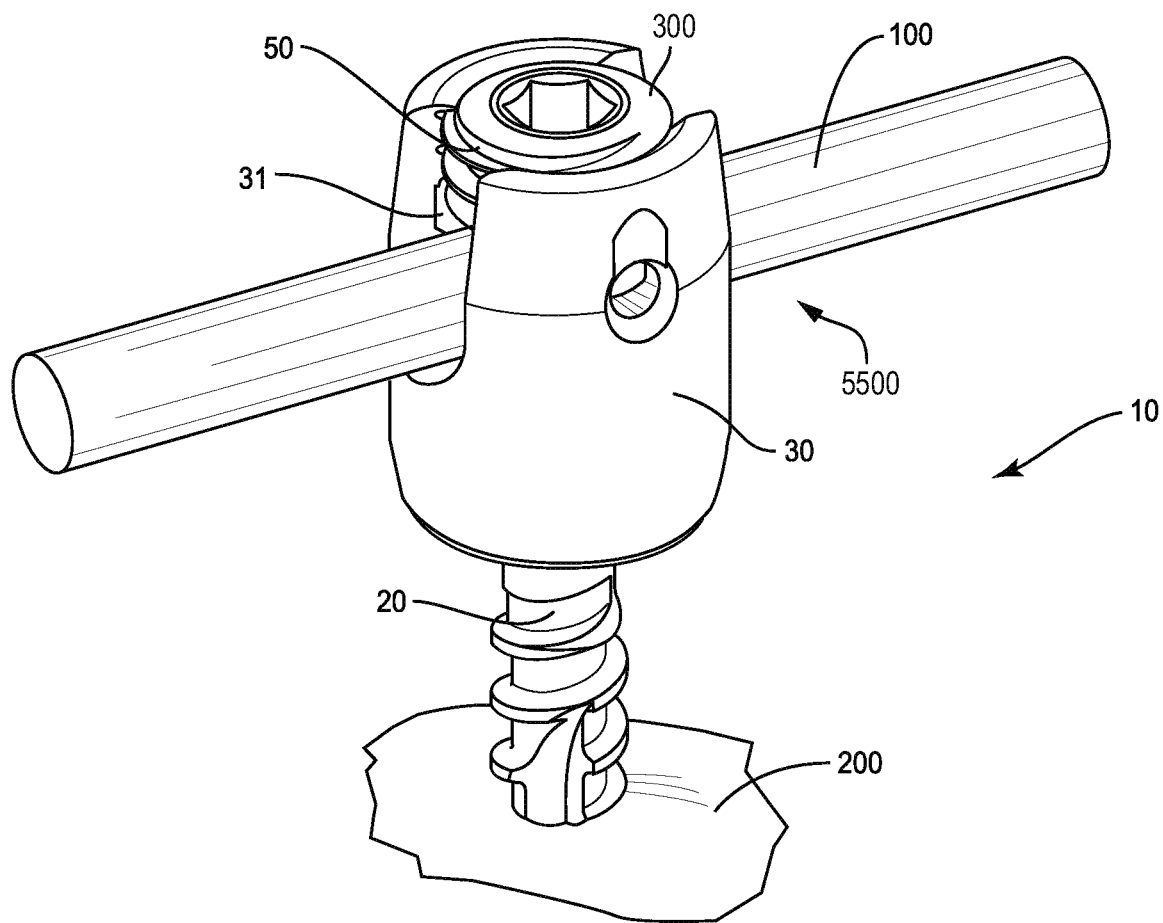
FIG. 1 illustrates an example anchoring assembly and longitudinal member according to an embodiment.

The exemplary embodiments of the surgical system and related methods of use disclosed are discussed in terms of medical devices for the treatment of musculoskeletal disorders and more particularly, in terms of a vertebral fixation screws, including for example pedicle screws, as well as hooks, cross connectors, offset connectors and related systems for use during various spinal procedures or other orthopedic procedures and that may be used in conjunction with other devices and instruments related to spinal treatment, such as rods, wires, plates, intervertebral implants, and other spinal or orthopedic implants, insertion instruments, specialized instruments such as, for example, delivery devices (including various types of cannula) for the delivery of these various spinal or other implants to the vertebra or other areas within a patient in various directions, and/or a method or methods for treating a spine, such as open procedures, mini-open procedures, or minimally invasive procedures. Exemplary prior art devices that may be modified to include the various embodiments of load sensing systems include, for example, U.S. Pat. Nos. 6,485,491 and 8,057,519, all incorporated herein by reference in their entirety.

The present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting.

In some embodiments, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior". Generally, similar spatial references of different aspects or components indicate similar spatial orientation and/or positioning, i.e., that each "first end" is situated on or directed towards the same end of the device. Further, the use of various spatial terminology herein should not be interpreted to limit the various insertion techniques or orientations of the implant relative to the positions in the spine.

The following discussion includes a description of a vertebral pedicle screw system and related components and methods of employing the vertebral pedicle screw in accordance with the principles of the present disclosure. Reference is made in detail to the exemplary embodiments of the present disclosure, which are illustrated in the accompanying figures.

The components of the vertebral pedicle screw system described herein can be fabricated from biologically acceptable materials suitable for medical applications, including metals, synthetic polymers, ceramics and bone material and/or their composites. For example, the components of the vertebral pedicle screw system, individually or collectively, can be fabricated from materials such as stainless steel alloys, commercially pure titanium, titanium alloys, Grade 5 titanium, super-elastic titanium alloys, cobalt-chrome alloys, stainless steel alloys, superelastic metallic alloys (e.g., Nitinol, super elasto-plastic metals, such as GUM METAL®), ceramics and composites thereof such as calcium phosphate (e.g., SKELITE™), thermoplastics such as polyaryletherketone (PAEK) including polyetheretherketone (PEEK), polyetherketoneketone (PEKK) and polyetherketone (PEK), carbon-PEEK composites, PEEK-BaSO$_4$ polymeric rubbers, polyethylene terephthalate (PET), fabric, silicone, polyurethane, silicone-polyurethane copolymers, polymeric rubbers, polyolefin rubbers, hydrogels, semi-rigid and rigid materials, elastomers, rubbers, thermoplastic elastomers, thermoset elastomers, elastomeric composites, rigid polymers including polyphenylene, polyamide, polyimide, polyetherimide, polyethylene, epoxy, bone material including autograft, allograft, xenograft or transgenic cortical and/or corticocancellous bone, and tissue growth or differentiation factors, partially resorbable materials, such as, for example, composites of metals and calcium-based ceramics, composites of PEEK and calcium based ceramics, composites of PEEK with resorbable polymers, totally resorbable materials, such as, for example, calcium based ceramics such as calcium phosphate, tri-calcium phosphate (TCP), hydroxyapatite (HA)-TCP, calcium sulfate, or other resorbable polymers such as polyaetide, polyglycolide, polytyrosine carbonate, polycaroplaetohe and their combinations.

Various components of the vertebral pedicle screw system may be formed or constructed material composites, including the above materials, to achieve various desired characteristics such as strength, rigidity, elasticity, compliance, biomechanical performance, durability and radiolucency or imaging preference. The components of the present vertebral pedicle screw system, individually or collectively, may also be fabricated from a heterogeneous material such as a combination of two or more of the above-described materials. The components of the vertebral pedicle screw system may be monolithically formed, integrally connected or include fastening elements and/or instruments, as described herein. The components of the vertebral pedicle screw system may be formed using a variety of subtractive and additive manufacturing techniques, including, but not limited to machining, milling, extruding, molding, 3D-printing, sintering, coating, vapor deposition, and laser/beam melting. Furthermore, various components of the vertebral pedicle screw system may be coated or treated with a variety of additives or coatings to improve biocompatibility, bone growth promotion or other features. To the extent the plate is entirely or partially radiolucent, it may further include radiographic markers made, for example of metallic pins, at one or both ends, on each corner of the ends, and/or along the length of the implant in various locations including near the center of the assembly.

The vertebral pedicle screw system may be employed, for example, with a minimally invasive procedure, including percutaneous techniques, mini-open and open surgical techniques to deliver and introduce instrumentation and/or one or more spinal implants at a surgical site within a body of a patient, for example, a section of a spine. In some embodiments, the vertebral pedicle screw system may be employed with surgical procedures, as described herein, and/or, for example, corpectomy, discectomy, fusion and/or fixation treatments that employ spinal implants to restore the mechanical support function of vertebrae. In some embodiments, the pedicle screw system may be employed with surgical approaches, including but not limited to: anterior lumbar interbody fusion (ALIF), direct lateral interbody fusion (DLIF), oblique lateral lumbar interbody fusion (OLLIF), oblique lateral interbody fusion (OLIF), transforaminal lumbar Interbody fusion (TLIF), posterior lumbar Interbody fusion (PLIF), various types of posterior or anterior fusion procedures, and any fusion procedure in any portion of the spinal column (sacral, lumbar, thoracic, and cervical, for example).

Figure 2:
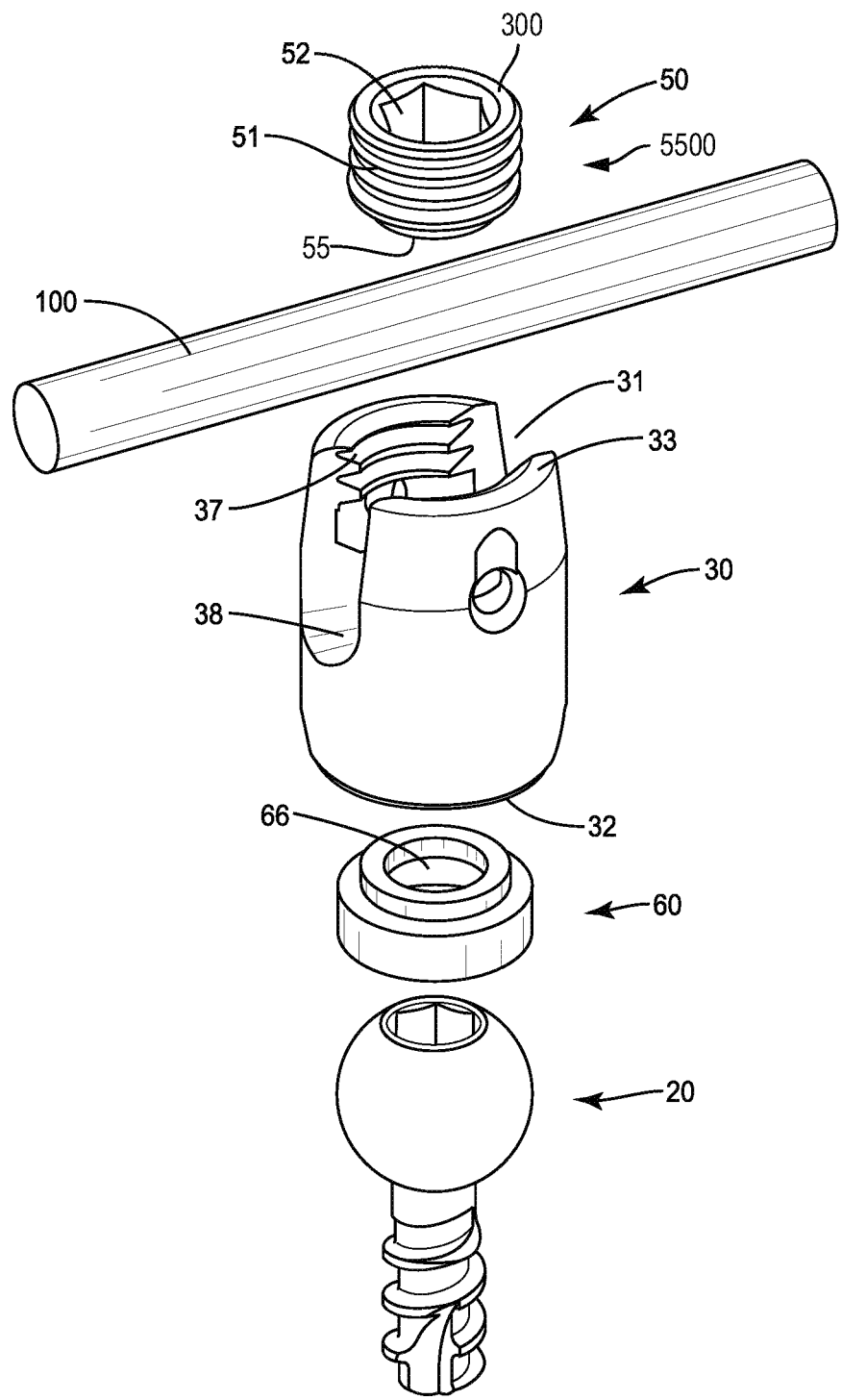
FIG. 2 illustrates an example exploded view of a screw assembly and longitudinal member according to an embodiment.

Referring generally to FIGS. 1-3, an example set screw assembly and anchoring assembly is illustrated. FIG. 1 may illustrate an example anchoring assembly and longitudinal member according to an embodiment. As illustrated in FIG. 1, an anchoring assembly may include a screw 20 and an anchoring member 30. The screw 20 may have an elongated shape with a first end mounted within a vertebral member 200 and a second end extending outward above the vertebral member 200. The anchoring member 30 may be configured to operatively connect to the second end of the screw 20 and may be movably connected to the screw 20 to accommodate the longitudinal member 100 positioned at various angular positions. The anchoring member 30 may include a channel 31 sized to receive the longitudinal member 100. A set screw 50 may attach to the anchoring member 30 to capture the longitudinal member 100 within the channel 31.

FIG. 2 illustrates an example exploded view of a screw assembly and longitudinal member according to an embodiment. As shown by FIG. 2, anchoring member 30 provides a connection between the screw 20 and longitudinal member 100. Anchoring member 30 includes a first end 32 that faces towards the vertebral member 200, and a second end 33 that faces away. A chamber may be positioned between the first and second ends 32, 33 and may be sized to receive at least a portion of the screw 20. In various embodiments, a first end 32 may be considered a base portion of an anchoring member 30, and a second end 33 may be considered a head portion of an anchoring member.

The second end 33 of the anchoring member 30 may include a channel 31 sized to receive the longitudinal member 100. Channel 31 terminates at a lower edge 38 that may include a curved shape to approximate the longitudinal member 100. Threads 37 may be positioned towards the second end 33 to engage with the set screw 50. In one embodiment as illustrated in FIG. 2, the threads 37 are positioned on the interior of the anchoring member 30 facing towards the channel 31. In another embodiment, the threads 37 may be on the exterior of the anchoring member 30. An interior of the anchoring member 30 may be open between the first and second ends 32, 33.

In various embodiments, an anchoring member 30 may include a washer 60. A washer 60 may be generally cylindrical and may have a hole 66 there through. As illustrated by FIG. 1 a washer 60 may be positioned near a first end 32 of an anchoring member 30. A screw 20 may engage with an anchoring member 30 via positioning through the hole 66 of a washer 60. A washer 60 may include recessed portions which may be configured to accommodate placement of a longitudinal member 100 therein. The use of a washer 60 in connection with an anchoring member 30 may help minimize misalignment of the longitudinal member within the anchoring member.

In an embodiment, set screw 50 attaches to the anchoring member 30 and captures the longitudinal member 100 within the channel 31. Set screw 50 may include an antenna 300, which will be explained in further detail below. As illustrated in FIG. 2, the set screw 50 may be sized to fit within the interior of the channel 31 and include exterior threads 51 that engage threads 37 on the anchoring member 30. Additionally, a cover portion 55 may contact longitudinal member 100 when the set screw 50 is rotatably positioned into a closed contact position above longitudinal member 100 and within anchoring member 30. A driving feature 52 may be positioned on a top side to receive a tool during engagement with the anchoring member 30, e.g., a screwdriver or the like having a corresponding head. In some embodiments, the set screw 50 may be mounted on an exterior of the anchoring member 30. Set screw 50 may include a central opening that partially extends into set screw 50 from drive feature 52 towards the second end 33. For example, the drive feature 52 may be a recessed portion having a covered bottom portion and circumferential side walls such that the drive feature 52 portion of set screw 50 does not fully extend through the set screw 50 from the top to the bottom. Threads 51 are positioned on an outside surface of the set screw 50 and engage with the threads 37 on the anchoring member 30. The set screw 50 and anchoring member 30 may be constructed for the top side of the set screw 50 to be flush with or recessed within the second end 33 when mounted with the anchoring member 30. For example, a common plane crossing over a top surface of antenna 300 and a top surface of second end 33.

Although FIGS. 1 and 2 illustrate an exemplary multi-axial tulip-head pedicle screw it shall be understood that other types of anchoring members may be used within the scope of this disclosure. For example, fixed head screws or screws having differently shaped heads may be used. As another example, a hook member, a cross-link connector, an offset connector, or a hybrid hook-screw member may be used as well.

Figure 3A:
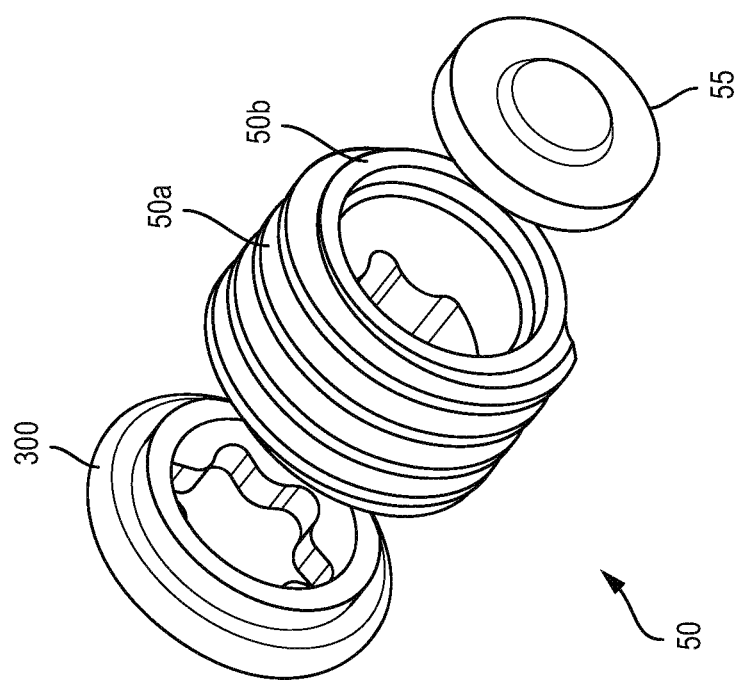
FIG. 3A illustrates an exploded view of an example set screw according to an embodiment.
Figure 3B:
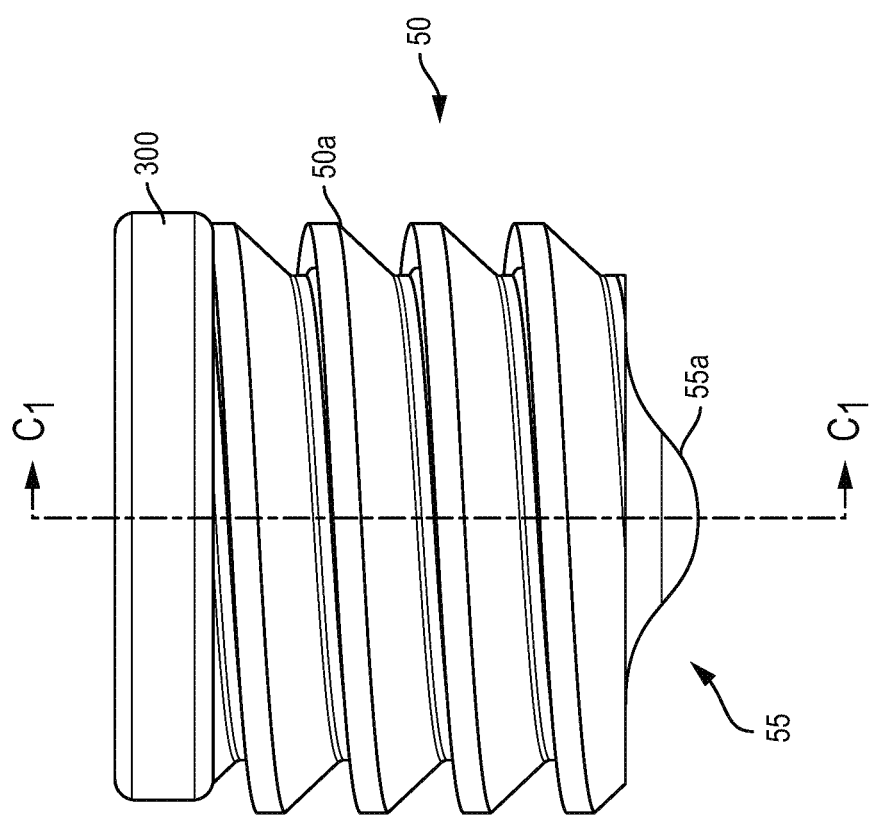
FIG. 3B illustrates an example set screw according to an embodiment.

FIG. 3A illustrates an exploded view of an example set screw 55, and FIG. 3B illustrates set screw 55 after being fully assembled according to an embodiment. As illustrated, set screw 50 may include an antenna 300, a body portion 50a, and a cover portion 55. Body portion 50a may include an outside surface with threads and a lower body cavity portion 50b defined by a depth and interior radius that corresponds to a depth and exterior radius of cover portion 55. For example, cover portion 55 may be dimensioned to fit inside at least a portion of body cavity portion 50b such that only a protrusion 55a extends from a lowermost surface of body portion 50a. Protrusion 55a may directly contact longitudinal rod 100 when set screw 50 is fully secured within anchoring member 30.

Figure 4:
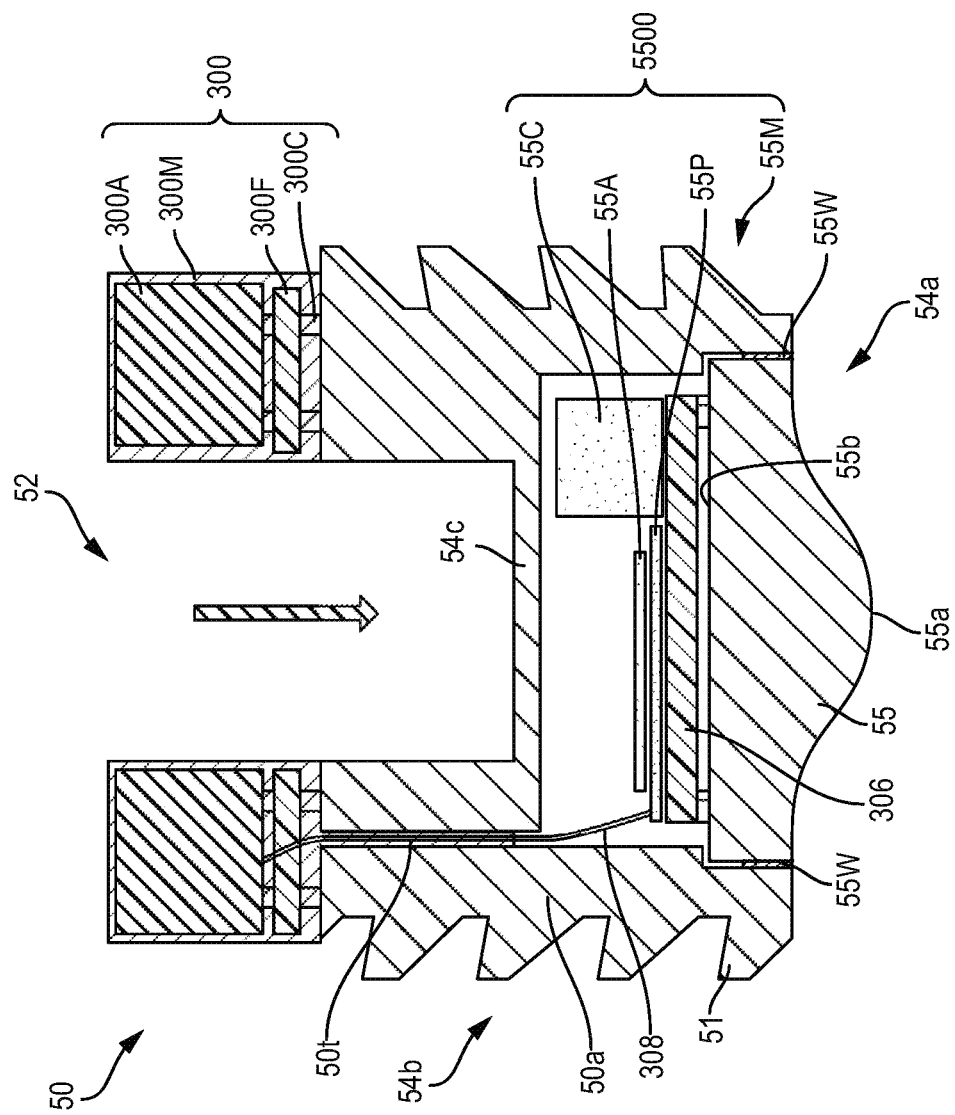
FIG. 4 illustrates a cross section drawing of an example set screw.

FIG. 4 illustrates a cross section drawing of an example set screw 50 taken along line $C_1$-$C_1$ of FIG. 3. In the example illustration, antenna 300 may be disposed on a top portion of main body 50a and cover portion 55 may be disposed in a lower cover cavity 54a of main body 50a. In example embodiments, antenna 300, may be a radio frequency identification (RFID) coil, a near field-communication (NFC) antenna or other short-range communication transmitter and/or receiver. Antenna 300 may include an axisymmetric coil 300a stacked on a ferrite base 300f and a carrier 300c. The axisymmetric coil 300a, ferrite 300f, and carrier 300c may be surrounded by an overmold 300m. An example overmold 300m may be an insulator material, such as a thermoplastic material like Polyether ether ketone (PEEK). In some embodiments, antenna 300 may be fixedly coupled to a top portion of set screw 50 and in other embodiments, antenna 300 may be removably coupled to a top portion of set screw 50, e.g., by mechanical means such as corresponding threads or snap locking features.

In an example embodiment, set screw 50 may include a drive feature 52 that passes through antenna 300 and into a cavity of set screw 50 that is defined by interior sidewalls of set screw 50 and a bottom sidewall 54c. Antenna 300 may also include a flexible electronics component, such as, for example, a flex circuit or one or more electrical circuits operably connected to the electronics components 5500 via a connecting member 308. For instance, as shown in FIG. 4, the connecting member 308 may be connected to both the antenna 300 and the electronics components 5500. The connecting member 308 may be positioned perpendicularly to both the antenna 300 and the electronics components 5500. In an example embodiment, connecting member 308 may pass from antenna 300 through a through hole 50t passing through main body 50a and into electronics cavity 54b for housing electronics components 5500. In an example embodiment, through hole 50t may be filled with an insulating material, for example the same or substantially same material as the overmold 300m. However, it shall be understood that through hole 50t may be filed with any suitable material that is effective at sealing through hole 50t, e.g., an epoxy or the like.

Example, electronics components 5500 may include a series of electronic components in electrical communication with one another. For example, a mainboard or other suitable printed circuit board (PCB) 55p may be electrically connected to an application specific integrated circuit (ASIC) 55a, a charge storage capacitor 55c, and various mechanical electrical sensors (MEMs) 55m. Example MEMs 55m may include a strain gauge, and/or a temperature gauge. However, other MEMs sensors may be incorporated in other embodiments depending on the particular use case. In some embodiments, electronics components 5500 may be an pre-packaged self-contained unit that is attached to cover 55 by, e.g., adhesive, chemical, mechanical or cement bonding. Additionally, electronics components 5500 may include a non-transitory data store (not illustrated) according to an embodiment, e.g., a memory cell such as a solid state memory cell or the like. The non-transitory memory data store may store information and/or data from various MEMs sensors 55m, for example. A non-transitory data store may be used to store various information. For example, one or more measurements of a strain gauge 306 may be stored in memory. As another example, a unique identifier associated with a load sensing assembly, a component thereof, or a set screw 50 may be stored in memory. Additional and/or alternate information or types of information may be stored as is consistent with this disclosure. Additionally, in some embodiments, electronics components 5500 may be coated in a material to prevent and/or suppress corrosion, e.g., a conformal coating, an epoxy coating, aerosol coating, or the like.

In various embodiments, electronics components 5500 may be fixedly coupled to cover portion 55 and have a connecting terminal or connecting portion 308 extending therefrom. The connecting terminal or connecting portion 308 may be suitably connected to a lead wire extending from antenna 300. For example, as shown in FIG. 4, electronics components 5500 are in electrical communication with antenna 300 by way of connecting portion 308. In various embodiments, connecting member 308, antenna 300, and/or electronics components 5500 may be constructed integrally or may be separately constructed and attached together in any suitable manner, such as for example by adhesive, chemical, mechanical or cement bonding.

In at least one embodiment, electronics components 5500 may be configured as a load sensing assembly. A load sensing assembly may include one or more electronics components 304 and/or a strain gauge 306, such as for example a silicon strain gauge. A strain gauge 306 may be a device that measures strain on an object. For instance, a strain gauge 306 may measure a force between a set screw and a longitudinal member when the set screw is engaged with an anchoring member. A strain gauge 306 may include one or more sensors or sensor nodes that measure strain, force, resistance, deflection, load and/or the like.

Figure 5B:
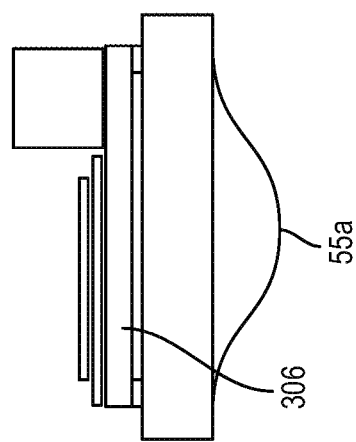
FIG. 5B illustrates a cross section drawing of a cover portion of a set screw.
Figure 5A:
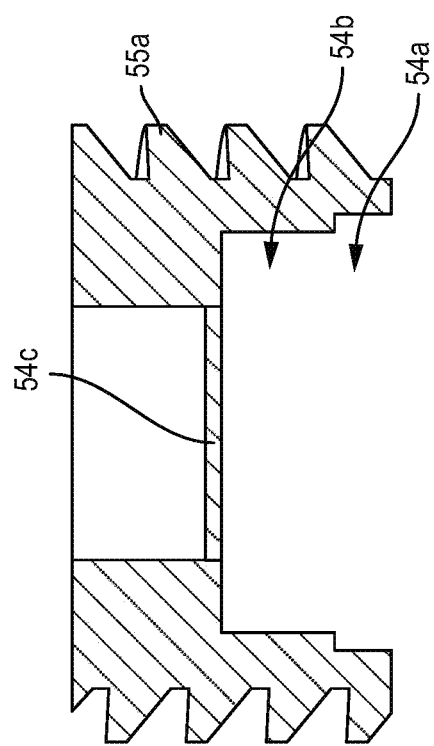
FIG. 5A illustrates a cross section drawing of a body portion of a set screw.

As illustrated in FIGS. 5A and 5B, a load sensing assembly may be configured to be coupled to a set screw 50. For example, cover 55 including electronics components 5500 may be coupled to set screw 50. In at least one embodiment, cover 55 including pre-installed electronics components 5500 are installed/inserted into the bottom portion of main body 50a in the corresponding lower cover cavity 54a. In at least one embodiment, lower cover cavity 54a may be dimensioned such that exterior side wall portions of cover 55 directly contact interior sidewall portions of cover cavity 54a. For example, lower cover cavity 54a may be defined by a radius of a first circle that corresponds to a radius of cover 55. However, in other embodiments, cover 55 may be oval shaped, hexagonal, or square and in those embodiments cover cavity 54a has a corresponding geometry imparting the same, substantially the same, or similar functional arrangement. Additionally, by installing cover 55 including pre-installed electronics components 5500 into a body portion of set screw 50 the electronics components 5500 are housed with electronics cavity 54b. Electronics cavity may open up to lower cover cavity 54a and may be enclosed at a top portion corresponding to the bottom sidewall 54c of drive interface 52. For example, bottom sidewall 54c may also function as a top surface, or ceiling, of electronics cavity 54b. It shall be understood that the relative position of bottom sidewall 54c may be lowered to accommodate different drivers interactive with drive feature 52 or may be raised to accommodate differently sized electronics components 5500. In an embodiment, the electronics cavity 54b may have a height of about twice the height of cover cavity 54a. Cover cavity 54a may be defined by a radius of a first circle in the horizontal direction and electronics cavity 54b may be defined by the radius of a second circle in the horizontal direction. In at least one embodiment, the radius of the first circle (corresponding to the cover cavity 54a) may be greater than the radius of the second circle (corresponding to the electronics cavity 54b). For example, an inset step may be provided where the cover cavity 54a and electronics cavity 54b meet one another relative to the main body 50a.

Consistent with previous disclosure, a strain gauge 306 may be operably connected, for example by adhesive, cement, mechanical or chemical bonding, to the electronics components 5500. For instance, a strain gauge 306 may be operably connected to the electronics components 5500 via the bottom surface 312 of the electronics components 5500. A strain gauge 306 may be connected to an inside surface 55b of cover 55 in any suitable manner including, without limitation, via an adhesive bonding agent. Strain gauge 306 may be situated in this way to detect strain in a curved contact portion of 55a acting against longitudinal rod 100 (see FIGS. 1 and 2).

Figure 6B:
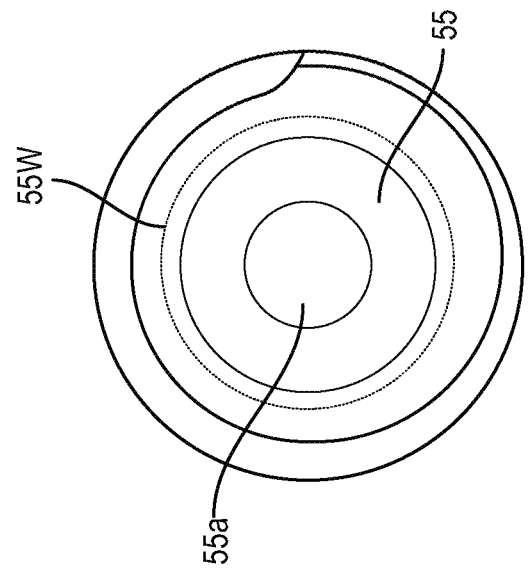
FIG. 6B illustrates a bottom view of an example cover portion after being welded to the example set screw of FIG. 6A.
Figure 6A:
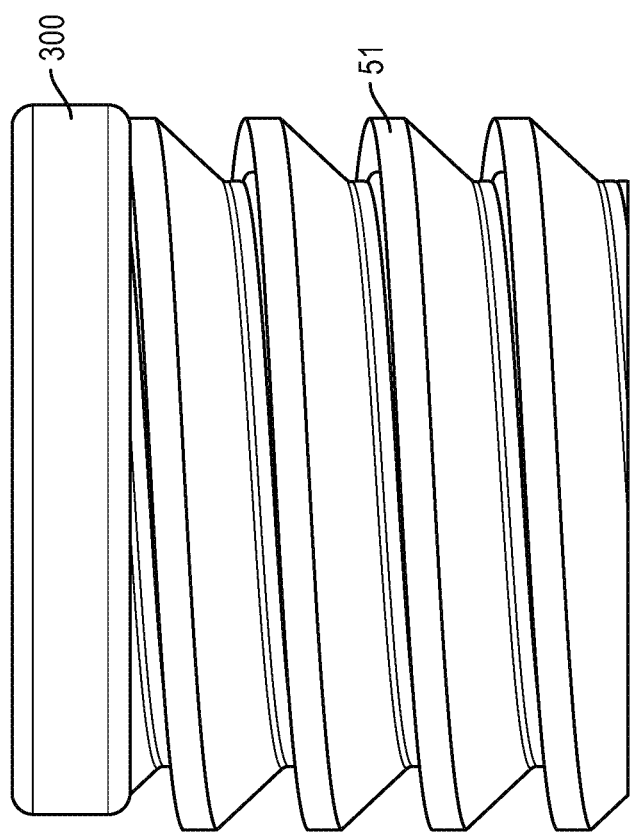
FIG. 6A illustrates a side view of an example set screw at a first assembly stage.

FIG. 6A illustrates an example set screw 50 at a first assembly stage with a pre-installed antenna 300. FIG. 6B illustrates a bottom view of an example set screw 50 after cover portion 55 has been fixedly attached to example set screw 50 of FIG. 6A. In at least one embodiment, cover portion 55 is fixedly attached to set screw 50 by a continuous weld 55w (see also FIG. 4). The continuous weld 55w may be any type of weld, for example a fillet weld or a butt joint weld. The continuous weld may be performed by any method, for example laser welding, gas welding, electron beam welding, etc. In some embodiments, a series of tack welds (not illustrated) may be performed at discrete intervals in substantially the same way and at substantially the same locations. At least one advantage to fixedly coupling cover portion 55 as previously disclosed is that electronics components 5500 may be securely protected by virtue of being in a fully sealed cavity, for example an airtight and water tight cavity, i.e., a hermetically sealed cavity.

Figure 7:
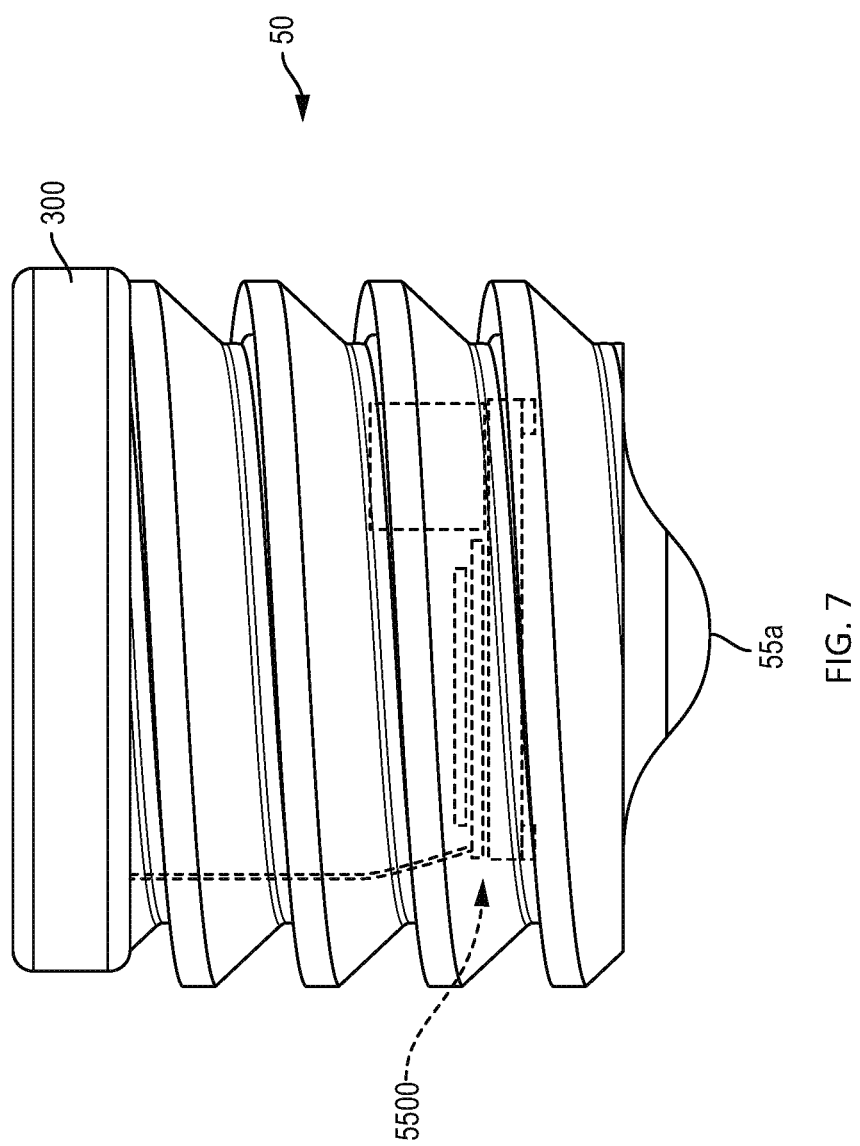
FIG. 7 illustrates a side view of an example set screw showing the interior electronic components in skeleton outlining.

FIG. 7 illustrates a side view of an example set screw 50 showing the interior electronic components 55000 in skeleton outlining. As illustrated in FIG. 7, the antenna 300 may circumferentially surround at least a portion of the exterior of the set screw 50. For example, antenna 300 may cover, at least partially, a top surface of set screw 50. In some embodiments, antenna 300 may cover the entire top surface (uppermost surface) of set screw 50. For example, antenna 300 may circumferentially surround a top surface of set screw 50. In other embodiments, the antenna 300 may be positioned at least partially inside of the central opening of a set screw (not illustrated). For example still, the antenna may be located, at least in part, proximate to a top portion of set screw 50. Consistent with the above disclosure, in certain embodiments, the strain gauge 306 may be connected to cover 55 such that it is positioned to measure a force between the set screw 55 and a longitudinal rod 100 (see FIGS. 1 and 2) when the set screw 50 engages with an anchoring member, for example protrusion 55a. Additionally or alternatively, other MEMs sensors, such as a temperature gauge for example, may be positioned to discern a body temperature of a patient in the same, similar, or substantially the same way. In at least one embodiment, a temperature sensor is positioned to discern a body temperature of a patient in the region of the longitudinal rod, and in others a temperature sensor is positioned to discern a body temperature of a patient in a region adjacent a threaded portion of set screw 51 that is directly exposed to patient tissue (i.e., not a portion contacting longitudinal rod 100).

In various embodiments, one or more measurements obtained by strain gauge 306 may be stored by an integrated circuit of a corresponding load sensing assembly such as, for example, in non-transitory computer readable memory as disclosed above. In turn, antenna 300 and/or electronics components 5500 may be interrogated by a reader. For instance, an RFID chip may be read by an RFID reader. As another example, an NFC chip may be read by or may otherwise communicate with an NFC reader or other NFC-enabled device. Example readers may include at least one antenna for receiving and/or transmitting data with antenna 300 of set screw 50, a central processing unit CPU, and a non-transitory computer readable medium (such as a memory unit or memory cell storing programmable computer implemented instructions). In at least one embodiment, an electromagnetic reader (first reader) may transmit electromagnetic energy to set screw 50 to power electronic components 55000 and an RFID reader or an NFC reader (second reader) may be used separately to read, acquire, and/or interpret data received from antenna 300. A reader may interrogate an integrated circuit when in a certain proximity to the integrated circuit. In certain embodiments, a reader may interrogate an integrated circuit that has been implanted into a patient as part of a set screw or anchoring member assembly. In other embodiments, an integrated circuit may communicate with a reader or other electronic device without being interrogated.

An integrated circuit of electronics components 5500 may transmit one or more measurements to the reader. This transmission may occur in response to being interrogated by the reader, or the transmission may be initiated by the integrated circuit. The reader may receive the transmitted measurements, and may cause at least a portion of the measurements to be displayed to a user. For instance, a physician may use a reader to interrogate an RFID chip of a patient's implant. The reader may include a display, or may be in communication with a display device, which may display at least a portion of the measurements received from the RFID chip.

Electronic components 5500 may include a passive integrated circuit. An example passive integrated circuit may refer to an arrangement where electronic components 5500 do not include an internal power source. For example, electronic components 5500 may be powered by energy transmitted from a reader. With respect to electronic components 5500 having a passive integrated circuit, the passive integrated circuit may not transmit information until interrogated by a reader. For example, a reader may transmit electromagnetic energy directed at the passive integrated circuit to wirelessly power the passive integrated circuit. At least two advantages of using an integrated circuit that does not include a battery or require a battery is reliability, and reduction in space within the cavity 54b that houses the electronic components 5500 forming a passive integrated circuit.

In various embodiments, one or more sensors of electronic components 5500 may transmit information by directly modulating a reflected signal, such as an RF signal. The strain gauge 306 sensors may form a Wireless Passive Sensor Network (WPSN), which may utilize modulated backscattering (MB) as a communication technique. External power sources, such as, for example, an RF reader or other reader, may supply a WPSN with energy. The sensor(s) of the WPSN may transmit data by modulating the incident signal from a power source by switching its antenna impedance.

In another embodiment, an integrated circuit may be active, meaning that the chip is battery-powered and capable of broadcasting its own signal. An active integrated circuit may transmit information in response to be interrogated by a reader, but also on its own without being interrogated. For instance, an active integrated circuit may broadcast a signal that contains certain information such as, for example, one or more measurements gathered by an associated strain gauge. An active integrated circuit may continuously broadcast a signal, or it may periodically broadcast a signal. Power may come from any number of sources, including, for example, thin film batteries with or without encapsulation or piezo electronics.

One or more measurements received from a load sensing assembly may be used to make determinations of the condition of a spinal implant and/or treatment of a spinal disorder. For instance, proper placement of a longitudinal member, set screw and/or anchoring member may result in an acceptable range of force measurements collected by a strain gauge of a load sensing assembly. Measurements outside of this range may indicate a problem with the placement or positioning of a longitudinal member, set screw and/or anchoring member such as, for example, loosening of a set screw and/or anchoring member, longitudinal member failure, construct failure, yield or fracture/breakage, improper torque, breakage of the bone segment or portion, the occurrence of fusion or amount of fusion, and/or the like. In these instances, the reader may contain a range of pre-determined acceptable values corresponding to the strain gauge 306 and/or other MEMs sensors. If the actual measured reading of the strain gauge 306 and/or other MEMs sensors falls outside of the range, the reader may notify an end user, a hospital management system, and/or the patient. For example, a patient may continuously or regularly monitor the actual measured readings of set screw 50 on an outpatient basis with a reader. In some embodiments, a reader may be configured to relay information received from antenna 3000 to a secondary processing component such as an external display, computer, server, hospital management system, or other type of data processing equipment. The secondary processing component may process information received by the reader from antenna 300 via a processor, controller, and memory configured to execute programmable computer implemented instructions. In this way, disclosed systems increase the likelihood that a patient can detect a malfunction, such as loosing of a set screw 50 and/or interbody system (see FIGS. 1 and 2), before catastrophic failure.

One or more tools or instruments may include a reader which may be used to gather information from one or more integrated circuits of electronic components 55000 during or in connection with a procedure. For instance, a torque tool (not illustrated) may be used to loosen or tighten set screw 50. A torque tool may include a reader, or may be in communication with a reader, such that a user of the torque tool is able to obtain, in substantially real time, one or more measurements relating to the set screw 50 and longitudinal rod 100 placement that are measured by a strain gauge 306 of a load sensing assembly of the set screw 50 via the tool. For instance, as a user is applying torque to a set screw 50, the user may see one or more force measurements between the set screw 50 and the longitudinal member in order to determine that the positioning of the set screw 50 and/or longitudinal member is correct and that the proper force is being maintained. In certain embodiments, a tool or instrument may include a display device (not illustrated) on which one or more measurements may be displayed. In other embodiments, a tool or instrument may be in communication with a display device (not illustrated), and may transmit one or more measurements for display on the display device via a communications network.

In some embodiments, an electronic device, such as a reader or an electronic device in communication with a reader (not illustrated), may compare one or more measurements obtained from an integrated circuit to one or more acceptable value ranges. If one or more of the measurements are outside of an applicable value range, the electronic device may cause a notification to be made. For instance, an electronic device may generate an alert for a user, and cause the alert to be displayed to the user via a display device. Additionally or alternatively, an electronic device may send an alert to a user such as via an email message, a text message, a notification, or otherwise.

An integrated circuit of electronics components 55000 may store a unique identifier associated with the components to which the load sensing assembly corresponds. For example, an integrated circuit of electronics components 55000 for a set screw 50 may store a unique identifier associated with the set screw 50 and/or cover 55. For example, when a reader interrogates an integrated circuit, the integrated circuit may transmit a unique identifier for a component that is stored by the integrated circuit to the reader. Having access to a unique identifier for a component may help a user ascertain whether the measurements that are being obtained are associated with the component of interest. Also, having access to a unique identifier for a component may help a user take inventory of one or more components. For instance, after spinal surgery, a physician or other health care professional may use a reader to confirm that all of the set screws and anchoring members allocated for the procedure have been used and are positioned in a patient. This may also help with the detection and verification of lost screws in a patient's body.

Figure 8:
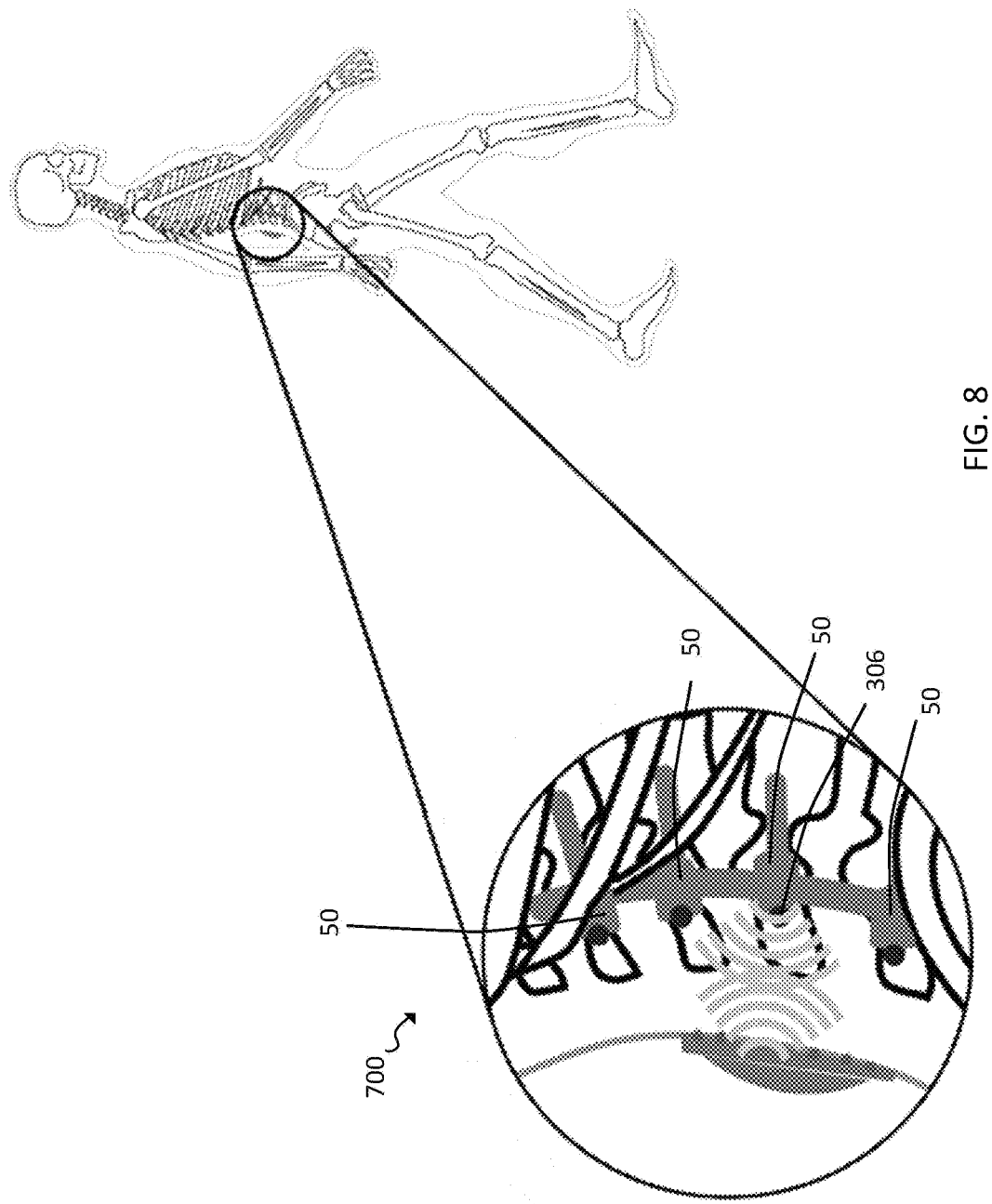
FIG. 8 illustrates an example of a surgical site monitoring system according to an embodiment.

FIG. 8 illustrates an example of a surgical site (SS) monitoring system 700 that may utilize example set screws 50 disclosed herein. In some embodiments, the SS monitoring system 700 may be a surgical site load monitoring system (at least those set screws 50 utilizing a strain gauge 306) and/or an infection monitoring system (at least those set screws 50 utilizing a temperature sensor).

In one or more embodiments, the SS monitoring system 700 may include an array of set screws 50, in which one or more of the set screws 50 have a have any type of MEMs sensor as previously disclosed. For the cases in which the SS monitoring system 700 includes an array of set screws 50 having various MEMs sensors, the received data from the one or more MEMs sensors of set screws 50 may be compared to one another to diagnose the quality of the surgical procedure, the integrity of the implant, and/or an infection at the surgical site.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A spinal implant comprising:
   a screw;
   an anchoring member including a channel sized to receive a spinal rod, the anchoring member configured to connect to the screw;
   a set screw configured to apply a clamping force to the spinal rod, the set screw comprising: a drive interface having a bottom surface, a cover portion seated in a corresponding cover cavity, the cover portion including a protrusion extending from a lowermost surface of the cover portion and configured to contact the spinal rod;
   an antenna; and
   electronics components comprising at least one sensor, and a circuit in communication with the antenna, the sensor adhered to an inside surface of the cover portion opposite the protrusion and configured to detect an external compression force applied to the protrusion by the spinal rod as the set screw applies the clamping force,
   wherein the sensor and circuit are positioned within a sealed cavity of the set screw, the sealed cavity being defined, at least partly, by the cover portion and the bottom surface of the drive interface, and
   wherein the antenna is configured to transmit information received from the at least one sensor to an external device.

2. The spinal implant of claim 1, wherein:
   the set screw comprises a through hole passing from a top surface of the set screw and through a sidewall of the set screw into the sealed cavity; and
   the antenna is located, at least in part, proximate to a top portion of the set screw.

3. The spinal implant of claim 2, wherein the antenna further comprises a connecting wire that is electrically connected to the circuit, and
   wherein the connecting wire extends through the through hole of the set screw and into the sealed cavity.

4. The spinal implant of claim 3, wherein:
   the antenna further comprises an overmold;
   the cover portion is welded to the set screw;
   the through hole is filled with an insulative material; and
   the sealed cavity of the set screw is hermetically sealed.

5. The spinal implant of claim 1, wherein the set screw further includes another sensor that comprises one or more of the following: a strain gauge, impedance sensor, pressure sensor, and capacitive sensor.

6. The spinal implant of claim 1, wherein the electronics components are powered by electromagnetic energy.

7. The spinal implant of claim 1, wherein the electronics components are not powered by a battery.

8. The spinal implant of claim 1, wherein:
   the sensor comprises a strain gauge; and
   the strain gauge is configured to detect strain in the surface of the cover portion opposite the protrusion.

9. The spinal implant of claim 1, wherein:
   the set screw is configured to engage with threads positioned on an interior of the anchoring member such that the set screw moves axially when rotated to clamp the spinal rod between the protrusion and a lower edge of the channel.

10. A system comprising:
    a plurality of spinal implants, wherein each spinal implant comprises:
    a screw;
    an anchoring member including a channel sized to receive a spinal rod, the anchoring member configured to connect to the screw;
    a set screw configured to apply a clamping force to the spinal rod, the set screw comprising: a drive interface having a bottom surface, a cover portion seated in a corresponding cover cavity, the cover portion including a protrusion extending from a lowermost surface of the cover portion and configured to contact the spinal rod;
    an antenna; and
    electronics components comprising at least one sensor, and a circuit in communication with the antenna, the sensor adhered to a surface of the cover portion opposite the protrusion and configured to detect an external compression force applied to the protrusion by the spinal rod as the set screw applies the clamping force,
    wherein the sensor and circuit are positioned within a sealed cavity of the set screw, the sealed cavity being defined, at least partly, by the cover portion and the bottom surface of the drive interface, and
    wherein the antenna is configured to transmit information received from the at least one sensor to an external device.

11. The system of claim 10, wherein each set screw comprises a through hole passing from a top surface of the set screw and through a sidewall of the set screw into the sealed cavity; and the antenna is located, at least in part, proximate to a top portion of the set screw.

12. The system of claim 11, wherein each antenna further comprises a connecting wire that is electrically connected to the corresponding circuit, and
- wherein each connecting wire extends through the corresponding through hole of the corresponding set screw and into the corresponding sealed cavity.

13. The system of claim 12, wherein:
each antenna further comprises an overmold;
each cover portion is welded to the corresponding set screw;
each through hole is filled with an insulative material; and
each sealed cavity of the corresponding set screw is hermetically sealed.

14. The system of claim 10, wherein each set screw includes another sensor that comprises one or more of the following: a strain gauge, impedance sensor, pressure sensor, and capacitive sensor.

15. The system of claim 10, wherein the electronics components of each set screw are powered by electromagnetic energy.

16. The system of claim 10, wherein the electronics components of each set screw are not powered by a battery.

\* \* \* \* \*